United States Patent
Godsk et al.

(10) Patent No.: US 7,931,444 B2
(45) Date of Patent: Apr. 26, 2011

(54) WIND TURBINE WITH ROTOR BLADES EQUIPPED WITH WINGLETS AND BLADES FOR SUCH ROTOR

(75) Inventors: Kristian Balschmidt Godsk, Kobenhavn O (DK); Thomas Steiniche Bjertrup Nielsen, Randers (DK)

(73) Assignee: Vestas Wind Systems A/S (DK)

( * ) Notice: Subject to any disclaimer, the term of this patent is extended or adjusted under 35 U.S.C. 154(b) by 123 days.

(21) Appl. No.: 12/489,263

(22) Filed: Jun. 22, 2009

(65) Prior Publication Data
US 2009/0257885 A1 Oct. 15, 2009

Related U.S. Application Data

(63) Continuation of application No. PCT/DK2007/000559, filed on Dec. 20, 2007.

(30) Foreign Application Priority Data

Dec. 22, 2006 (DK) .................................. 2006 01705
Aug. 10, 2007 (DK) .................................. 2007 01142

(51) Int. Cl.
*F03D 1/02* (2006.01)
(52) U.S. Cl. ..................... 416/228; 416/237; 416/DIG. 2
(58) Field of Classification Search .............. 416/146 R, 416/228, 241 R, 237, 191, 192, DIG. 2
See application file for complete search history.

(56) References Cited

U.S. PATENT DOCUMENTS

| 4,329,115 A * | 5/1982 | Kress ................................. 416/11 |
| 5,217,349 A * | 6/1993 | Succi ............................. 415/119 |
| 6,503,058 B1 * | 1/2003 | Selig et al. |
| 7,540,716 B2 * | 6/2009 | Wobben ......................... 416/228 |

FOREIGN PATENT DOCUMENTS

| CN | 1563707 A * | 1/2005 |
| DE | 19738278 A1 * | 3/1999 |
| DE | 19963252 A1 | 7/2001 |
| EP | 1500814 A1 * | 1/2005 |

(Continued)

OTHER PUBLICATIONS

Johansen, Jeppe and Sorensen, Niels N. 'Aerodynamic investigation of Winglets on Wind Turbine Blades using CFD'. Rapport nr. Riso-R-1543(EN), Feb. 2006. [fremskaffet den Aug. 20, 2007] - fremskaffet fra Internettet <URL:http://www.risoe.dk/rispubl NEA/veapdf/ris-r-1543.pdf > 17 pages.

(Continued)

*Primary Examiner* — Christopher Verdier
*Assistant Examiner* — Aaron R Eastman
(74) *Attorney, Agent, or Firm* — St. Onge Steward Johnston & Reens LLC (57) ABSTRACT

A wind turbine includes a rotor with wind turbine blades each having a root end connected to a hub of the wind turbine and a tip end, the tip end of each of which being equipped with a winglet extending a distance in a direction perpendicularly to a longitudinal direction of the blade. A new and much more slim design of the outer part of the wind turbine blade is disclosed, i.e. with a shorter chord length designed within a narrow band of values defined with respect to the length of the winglet, i.e. the extension in the direction transverse to the longitudinal direction of the blade.

21 Claims, 4 Drawing Sheets

FOREIGN PATENT DOCUMENTS

| | | | |
|---|---|---|---|
| JP | 2004084590 | A | 3/2004 |
| WO | 2004061298 | A2 | 7/2004 |
| WO | 2005078277 | A2 | 8/2005 |
| WO | 2006059472 | A1 | 6/2006 |
| WO | 2006090215 | A1 | 8/2006 |

OTHER PUBLICATIONS

Danish Search Report; PA 2007 01142; Nov. 9, 2007; 2 pages.
Danish Search Report; PA 2006 01705; Aug. 23, 2007; 3 pages.
International Search Report; PCT/DK2007/000559; Oct. 8, 2008; 3 pages.
Hasegawa, Y. et al. 'Numerical Analysis of a Horizontal Axis Wind Turbine Rotor with Winglets', Transactions of the Japan Society of Mechanical Engineers. B vol. 62, No. 600(19960825) pp. 3088-3094 The Japan Society of Mechanical Engineers ISSN:03875016, publiceret Aug. 25, 1996, [fremskaffet den Aug. 20, 2007]—fremskaffet fra Internettet <URL:http://nels.nii.ac.jp/els/con tents__ disp.php?id=ARTOO 02698273&type----pdf&lan g=en&host--cinii &order n.
Johansen, J. et al.: "Numerical Analysis of Winglets on Wind Turbine Blades using CFD" EWEC 2007 conference, 08 maj 2007. [fremskaffet den Aug. 27, 2007]fremskaffet fra Internettet <URL:http://www.ewec20 07proceedings.info/allfiles 2/344__ Ewee2007fullpaper .pdf. 6 pages.
Shahidehpour, Mohammad et al. 'IPRO 344—Technical and Market Integration of Wind Energy Final Report' Ilinois Institute of Technology, efterdret 2006. [fremskaf-fet den Aug. 20, 2007] fremskaffet fra Internettet <URL:http://www.iitedu/--ipro344f06/archive/deri vables/IPRO344F06__Final Report.pdt og tilhorende poster <URL:http://ilcnow.iit.edu/dovml oad.php?file=2652> og tilhorende konferencepro-gram til frernlmggelsesdag afholdt den 1. Dec. 2006 [fremskaffet den Sep. 20, 2007] <URL:http://ipro.itt.edu/ home/do wnloads/iproday__f06/Fall__2006__IPRO__Day Schedule.
Shahidehpour, Mohammad et al. 'IPRO 344—Technical and Market Integration of Wind Energy' Illinois Institute of Technology, efterket 2006. [fremskaffet den Aug. 20, 2007]—frensjaffet fra Internettet <URL:http://www.iit.edukipro34 4f06 /archive/derivables /IPRO344F06 FinalRepor t.pdf> og poster <URL: http://iknow. iitedu/download.php?file=2652> 2 pages.
Shimooka, M. et al. Basic Study of Winglet Effects On Aerodynamics and Aeoracoustics Using Large-Eddy Simulation' European Wind Energy Conference & Exhibition, Feb. 27-Mar. 2, 2006; 9 pages.
International Preliminary Report on Patentability & Written Opinion of the International Searching Authority; PCT/DK2007/000559; Jun. 24, 2009; 5 pages.

* cited by examiner

WIND TURBINE WITH ROTOR BLADES EQUIPPED WITH WINGLETS AND BLADES FOR SUCH ROTOR

CROSS-REFERENCE TO RELATED APPLICATIONS

The present application is a continuation of pending International patent application PCT/DK2007/000559 filed on Dec. 20, 2007 which designates the United States and claims priority from Danish patent application PA 2007 01142 filed Aug. 10, 2007 and Danish patent application PA 2006 01705 filed Dec. 22, 2006, the content of which is incorporated herein by reference.

FIELD OF THE INVENTION

The present invention relates to a wind turbine having a rotor with wind turbine blades equipped with winglets and having a particular airfoil design to improve the performance of the wind turbine

BACKGROUND OF THE INVENTION

It has for a number of years been common practice in air craft wing design to arrange different types of winglets or other means at the wing tip for reducing or preventing the spanwise flow of air from the pressure (lower) side of the wing profile to the suction (upper) side of the profile around the tip, which results in the creation of the tip vortex and a decreased lift coefficient at the tip section of the wing, mainly due to the reduced suction at the suction side. Wind turbine rotors having blades equipped with winglets are also known in the art, mainly for the purpose of reducing noise emission from the wind turbine due to the presence of the tip vortices but also to improve the overall performance of the wind turbine.

WO 2004/061298 A2 discloses such blade for a wind turbine, where a particular design of the winglet itself is disclosed.

EP 1 500 814 A1 shows a wind turbine blade with an end projection having an aerodynamic cross-sectional profile, which lies in a plane extending at an angle to the rotor blade plane. The end projection is asymmetric to the central longitudinal axis of the rotor blade, with a progressive or stepped reduction in the blade thickness at the transition between the end projection and the remainder of the rotor blade.

WO 2005/078277 A2 relates to a rotor blade for a wind turbine with a drag ratio, in particular in the central or main board region of said rotor, whose value exceeds 80% and preferably 90% of the maximum value of said ratio in the range of +/−20 of the optimum pitch of said rotor.

One of the consequences of producing lift on a finite wing is the generation of spanwise flow around the tip which influences the flow pattern in the whole tip region. In particular, the pressure gradients caused by the lower pressures on the upper surface relative to the higher pressures on the lower surface lead to inward spanwise flow (toward the hub) on the upper surface and outward spanwise flow (toward the tip) on the lower surface. At the trailing edge, the merging of these two flows having different directions generates the vorticity that is shed from a finite wing and is the origin of induced drag as well as aerodynamic noise.

An endplate at the tip of a finite wing can reduce the spanwise flow and thereby reduce the induced drag. Unfortunately, to be effective, the endplate must be so large that the increase in wetted area drag far outweighs any drag reduction.

A winglet, rather than being a simple fence which limits the spanwise flow, carries an aerodynamic load that produces a flow field i.e. an inward side force that allows its own induced velocity field to partially cancel that of the main wing, thereby reducing the amount of spanwise flow. In essence, the winglet diffuses or spreads out the influence of the tip vortex such that the downwash and, in turn the induced drag, are reduced. In this way, the winglet acts like an endplate in reducing the spanwise flow but, by carrying the proper aerodynamic loading, it accomplishes this with much less wetted area.

The displacement of the wing tip out and away from the main wing planform reduces the effect of the shed vorticity on the wing by displacing the concentrated vorticity away from the wing. In this manner, the winglet emulates the effect of a planar span extension and an increase in the length of the load perimeter.

The diffusion process is also realized as an expansion of the wake in the far field due to induced velocities from the non-planar components of the winglet. The out of plane bound vortex on an upward winglet induces horizontal velocities on the free wake that cause a spanwise spreading of the wake field. This also emulates the effect of a span increase.

Another benefit of winglets, which is not achieved by a simple span extension, is the effect on the spanwise lift distribution, particularly in the region of the wing tip. The influence of the winglet effectively loads the planform in the tip region, increasing the local lift coefficients and filling out the spanwise lift distribution. Planform efficiencies greater than those of an elliptical wing are possible. This occurs because, as evidenced by the extension of the roughly constant lift coefficients to beyond the actual tip location, the tip loaded spanwise lift distribution is, in fact, behaving like that of a nearly elliptically loaded planform of a greater span. When referenced to the actual span, the resulting efficiency is greater than that of an elliptical loading.

Summering up the overall benefits of winglet vs. tip extension is:
1. Installation of winglets is found to cause a larger increase in the power coefficient and a smaller increase in the flap bending moment than radially extended rotor blades
2. The smaller turbine diameter for the same tip velocity results in smaller gear ratio.
3. On some sites the local regulations dictates maximum wind turbine height (tower+blade tip in highest position).
4. Decrease noise from tip vortices.

SUMMARY OF THE INVENTION

The advantages discussed above of the application of winglets on wind turbine blades have lead to design trend where the blade part extending from the hub and to the tip end of the blades immediately adjacent the winglet, i.e. at the winglet root, is designed as the inner part of a longer wind turbine blade because the presence of the winglet reduces the adverse tip effects on the lift coefficient at the outer part of the blade near the tip and a higher performance of that part of the blade may be achieved, which is particularly interesting because this part sweeps a large section of the total area swept by the rotor. This design leads to relatively large chord lengths at the outer part of the blade, i.e. the outer about 5% of the complete rotor radius.

It is an object of the present invention to provide an improved design of a wind turbine blade with a winglet that results in an improved performance of the wind turbine with respect to yearly production and preferably also reduced noise emission.

It has been found by the present invention that an optimisation of the performance of the wind turbine may be achieved by designing the outer part of the blade much more slim, i.e. with a shorter chord length designed within a narrow band of values defined with respect to the length of the winglet, i.e. the extension in the direction transverse to the longitudinal direction of the blade. The reduction in chord length has shown to reduce the actual drag more than the reduction in lift and results in an improved performance. Thus, the present invention relates to a wind turbine comprising a rotor with wind turbine blades each having a root end connected to a hub of the wind turbine and a tip end, the tip end of each of which being equipped with a winglet extending a distance in a direction perpendicularly to a longitudinal direction of the blade, wherein the combined radius specific solidity ($Sol_r$) of the rotor at the tip end of the blades immediately adjacent the winglet is 0.085 times the extension of the winglet divided by the radius of the rotor, plus a value within the range of 0.0012 and 0.0048. However, for an optimum effect of the winglet, the inventor's studies indicates that said value preferably is within the range of 0.0016 and 0.0042, and most preferred within the range of 0.0024 and 0.0040. The extension of the winglet and the radius of the rotor are taken in absolute values, so that their ratio, i.e. the extension of the winglet divided by the radius of the rotor, will be a fraction, typically in the order of 0.01 to 0.04. Thus, an example of a typical calculation of the combined radius specific solidity ($Sol_r$) of the rotor at the tip end of the blades immediately adjacent the winglet is for a blade where the ratio of the winglet extension and the rotor radius is 0.025 and said value is selected as a medial value of the last mentioned range: (0.085 times 0.025)+0.0032=0.0053.

The solidity of a wind turbine rotor is the ratio between the area of the blades projected into the rotor plane and the total area covered by the rotating blades, $A_{blade}$. The combined solidity, i.e. the sum of solidifies of the blades, is hence:

$$Sol = \frac{n \cdot A_{blade}}{\pi R^2}$$

Where n is the number of wind turbine blades, e.g. 2, 3 or 4.

Solidity may also be established for a specific radius, r, from the centre of the rotor plane. The radius specific solidity of the wind turbine blade decreases as a function of the specific radius, r, and the combined radius specific solidity $Sol_r$. The combined radius specific solidity ($Sol_r$) of the rotor is defined as $$Sol_r = \frac{n \cdot c_r}{2\pi R}$$

where n is the number of blades in the rotor, normally 2 or 3, $c_r$ the chord length at the distance r from the hub and R the radius of the rotor.

In a preferred embodiment of the present invention, the outer end of the blades are designed so that the combined radius specific solidity ($Sol_r$) of the rotor increases continuously from the tip end of the blade and to a value in the range of 0.0065 to 0.013 at a position 5% of the rotor radius R from the tip in the direction of the hub, preferably in the range of 0.008 to 0.011 and most preferred within a range of 0.0085 to 0.01. It is particularly preferred that the combined radius specific solidity of the rotor increases substantially linearly, i.e. within a deviation of +/−5-8% from a linear increase as a function of distance from the tip.

According to another preferred embodiment of the present invention, the whole outer part of the blades of the rotor is designed in a particular manner to improve the overall performance of the rotor. Is has been found that the optimal design depends strongly on the height of the winglet, and the invention further relates to a wind turbine comprising a rotor with wind turbine blades each having a root end connected to a hub of the wind turbine and a tip end, the tip end of each of which being equipped with a winglet extending a distance $X_{height}$ in a direction perpendicularly to a longitudinal direction of the blade, wherein the combined radius specific solidity ($Sol_r$) of the rotor at the tip end part of the blades substantially is designed in accordance with the formula $$Sol_r = -0.34087 \cdot \left(\frac{r}{R}\right)^2 + 0.6004 \cdot \left(\frac{r}{R}\right) - 1.236 \cdot \left(\frac{X_{height}}{R}\right)^2 + 0.12548 \cdot \left(\frac{X_{height}}{R}\right) - 0.25276 + C$$

r being the distance to the hub and R the radius of the rotor, wherein C is defined as a constant for the whole rotor design and is chosen within the range of −0.006 and 0.006, the combined radius specific solidity ($Sol_r$) of the rotor being defined as $$Sol_r = \frac{n \cdot c_r}{2\pi R}$$

n being the number of blades in the rotor, $c_r$ the chord length at the distance r from the hub.

The wide range of the design reflects the fact that wind turbine rotors are designed for the type of wind the individual wind turbine will be subjected to, i.e. the expected distribution of wind velocities.

This blade tip design may advantageously be combined with the aforementioned design according to the present invention.

It is preferred that C is chosen within the range of −0.004 and 0.004, preferably within the range of −0.003 and 0.003.

In a preferred embodiment of the present invention, said tip part being designed according to said formula constitutes at least the outer 5% of the blade length of each of the blades of the rotor, preferably at least the outer 8% of the blade length of each of the blades of the rotor, and most preferred at least the outer 10% of the blade length.

The combined radius specific solidity ($Sol_r$) of said tip part is designed substantially in accordance with the formula, which in a preferred embodiment means that it deviates less than 12% from the combined radius specific solidity ($Sol_r$) defined by said formula, preferably less than 8% and most preferred less than 6%.

The extension of the winglet may with the present invention exceed the commonly applied 1.2% to 1.5% of the rotor radius with improved performance of the wind turbine. Thus, the winglet extends preferably in the range of 0.5% to 5% of the radius R of the rotor, and most preferred in the range of 2% to 4% of the radius.

It is preferred that the maximum lift coefficient $C_{l,max}$ of the blades, where $C_{l,max}$ is valid for a two-dimensional flow passing a smooth profile surface, at the outer 10% of the radius R of the rotor is within the range of 0.9 and 2.0, and it is furthermore preferred that the maximum lift coefficient $C_{l,R}$ at the tip end of blades is within the range of 0.2 and 1.4. For a further discussion of the maximum lift coefficient, please refer to WO 2006/090215.

With respect to the design of the winglet, it is preferred that the combined radius specific solidity of the winglet tip chord is within the range of 0.0 and 0.02 for blade radius r taken as the rotor radius R, and the maximum lift coefficient ($C_{l,max}$) for the winglet tip chord is within the range of 0.0 and 0.4. It is furthermore preferred that the combined radius specific solidity ($Sol_r$) of the rotor at the tip end of the blades immediately adjacent the winglet is substantially equal to the combined radius specific solidity at the winglet root chord, and that the combined radius specific solidity decreases substantially continuously, more preferably linearly with the distance to the tip, from the winglet root chord to the winglet tip chord.

The winglet may extend to the pressure side, which is the most common in order to avoid interference with the wind turbine tower, or the winglet may extend to the pressure side as well as to the suction side of the blade. However, it is preferred that the winglets extend said distance ($X_{height}$) to the suction side of the blades of the rotor as it in combination with the present invention has shown to provide an improved performance of the wind turbine.

It is furthermore preferred that the winglet inflow angle of attack $\alpha_{AoA}$ is in the range of −5 to 10°, preferably in the range of −2 to 8° and most preferred in the range of 0 to 5°.

It is also a preferred embodiment of the present invention that the winglet inclination angle of attack to blade is within the range of 70 to 150°, preferably in the range of 80 to 120° and most preferred in the range of 90 to 100°.

It is a further preferred embodiment of the present invention that the winglet leading edge displacement $X_{LED}$ is less than the winglet root chord, preferably within the range of 5% to 75% thereof and most preferred with the range of 10% to 50% thereof.

It is a yet further preferred embodiment of the present invention that the winglet trailing edge displacement $X_{TED}$ is less than plus or minus 30% of winglet root chord, i.e. that the trailing edge of the winglet at very tip of the winglet may be displaced in front of or behind the trailing edge of the main wing, preferably in the range of plus or minus 2% to plus or minus 20% thereof and most preferred within the range of plus or minus 5% to plus or minus 10% thereof.

The present invention also relates to wind turbine blades having a root end with means for coupling said root end to a hub of a wind turbine and a tip end having a winglet, the blade being suitable for use in a wind turbine having the characteristics as described above, wherein the number of wind turbine blades is n=2 or n=3.

BRIEF DESCRIPTION OF THE DRAWINGS

The enclosed figures illustrates terms and effects related to the present invention.

DETAILED DESCRIPTION OF THE INVENTION

Figures 1, 2, 3:
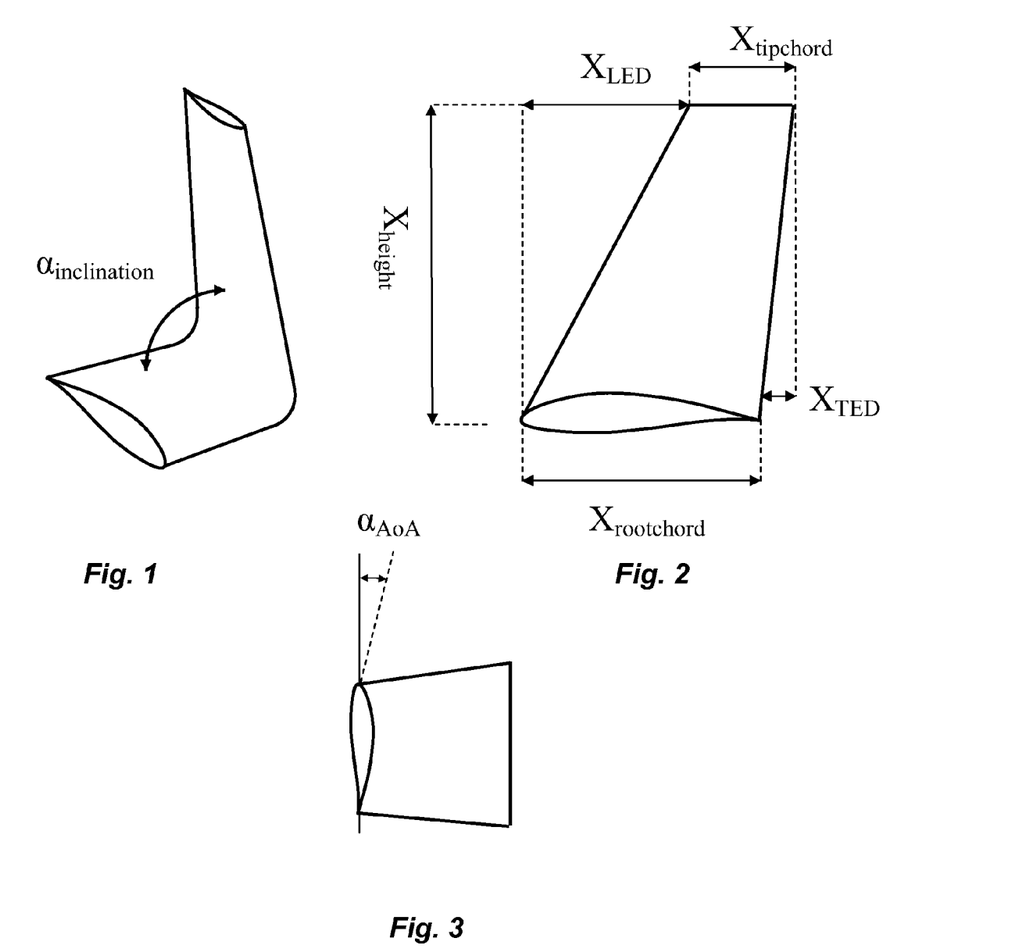
FIG. 1 illustrates the inclination of the winglet to the blade.
FIG. 2 illustrates the winglet height, the winglet root chord, the winglet tip chord, the leading edge displacement and the trailing edge displacement.
FIG. 3 illustrates the winglet angle of attack.

In FIG. 1, the tip end of a blade is shown as seen in perspective with the winglet pointing upwards, and the inclination of the winglet to the blade is shown as the winglet inclination angle to blade, $\alpha_{inclination}$, defined as the angle between the main wing centre line and the winglet centre line.

In FIG. 2 the tip end of a blade is shown as seen from the end thereof, i.e. the blade itself extends away from the viewer of FIG. 3. The winglet height, $X_{height}$, is defined as the distance from the main wing chord line at the very tip to the chord line of the very tip of the winglet. The winglet root chord, $X_{rootchord}$, is defined as the distance from the leading edge to the trailing edge of the main wing at the very tip where the winglet is attached. The winglet tip chord, $X_{tipchord}$, is defined as the distance from the leading edge to the trailing edge of the winglet at the very tip of the winglet. The winglet leading edge displacement, $X_{LED}$, is defined as the distance from the leading edge of the main wing at the very tip to the leading edge of the winglet at very tip of the winglet. The winglet trailing edge displacement, $X_{TED}$, is defined as the distance from the trailing edge of the main wing at the very tip to the trailing edge of the winglet at very tip of the winglet.

In FIG. 3 the tip end of a blade is shown as seen from the side to which the winglet tip points, i.e. the tip of the winglet of FIG. 3 points towards the viewer. The winglet angle of attack, $\alpha_{AoA}$, is defined as the angle between the line parallel to the main wing chord plane at the tip and the winglet root chord plane Modifying the blade with different winglets has shown to increase the efficiency of the rotor i.e. the amount of energy that the rotor extracts from the wind.

The annual increase in production for a turbine with an average wind speed of 8.5 m/s for a standard wind turbine rotor has been calculated theoretically for various extensions of the winglet:

|  | original | 1% Winglet | 2% Winglet | 4% Winglet |
|---|---|---|---|---|
| Percent increase in annual production for an average wind speed of 8.5 m/s | 0.0 | 0.9 | 1.5 | 2.4 |

It is observed that the main effect of the blade design according to the invention arise for wind speeds between 5-11 m/s. This is highly advantageous, as for higher wind speed, the maximum production is already reached and for smaller wind speeds, radial movement of the wind has limited effect. It appears that the increase tends to be larger for larger heights of the winglets, but a practical limit with respect to mechanical construction and forces on the tip part of the blades due to the presence of the winglet is about 5% of the radius of the wind turbine.

Figure 4:
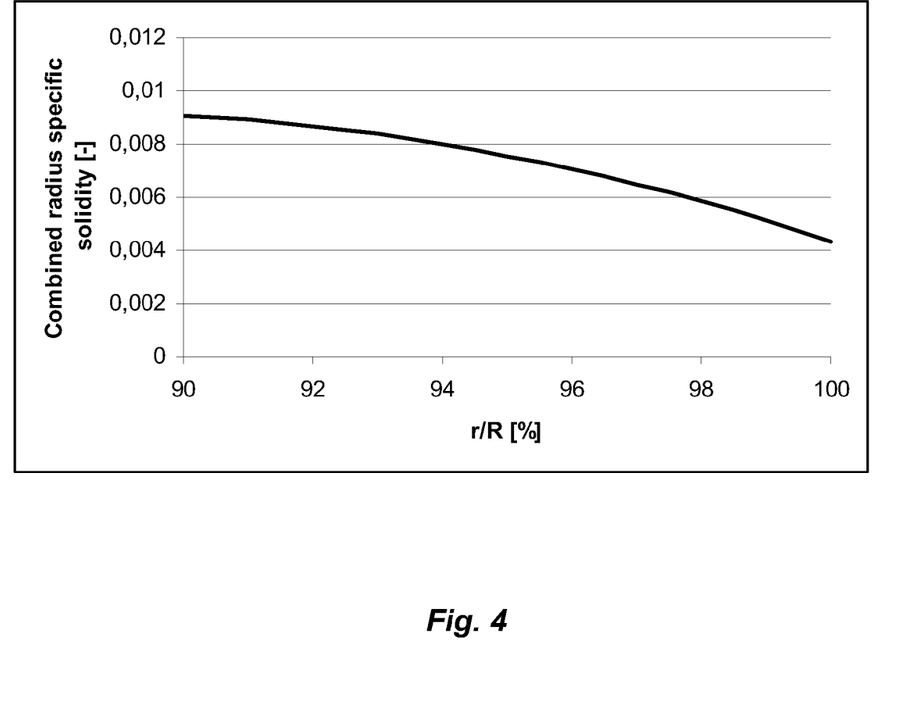
FIG. 4 shows a preferred combined radius specific solidity of the outer 10% of a wing turbine rotor having a 1% winglet height.
Figure 5:
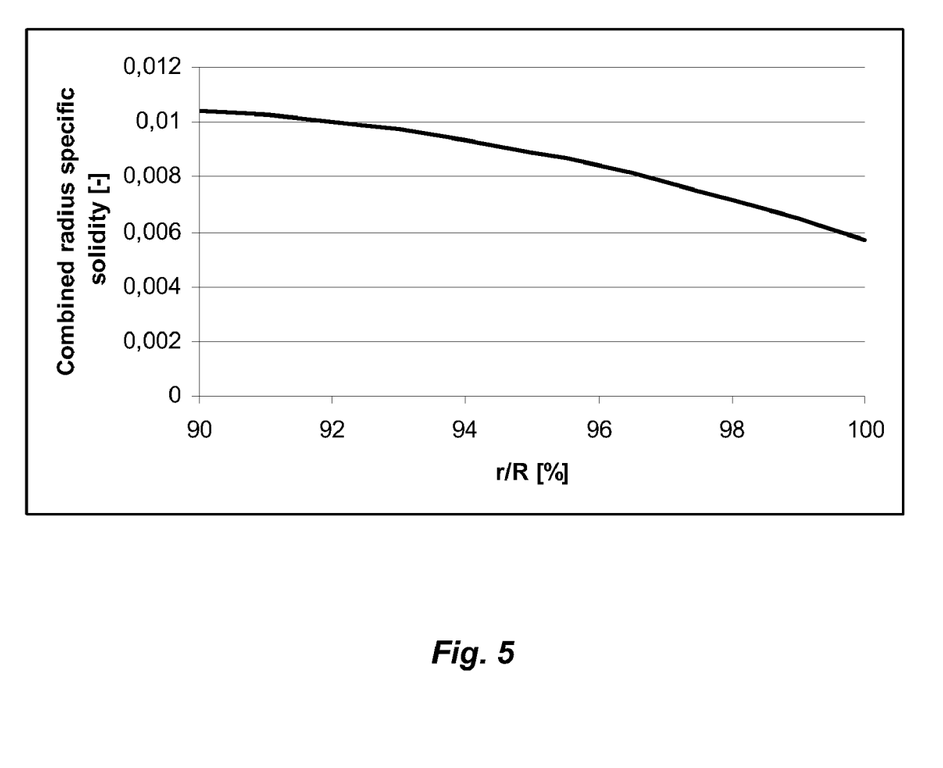
FIG. 5 shows a preferred combined radius specific solidity of the outer 10% of a wing turbine rotor having a 2% winglet height.
Figure 6:
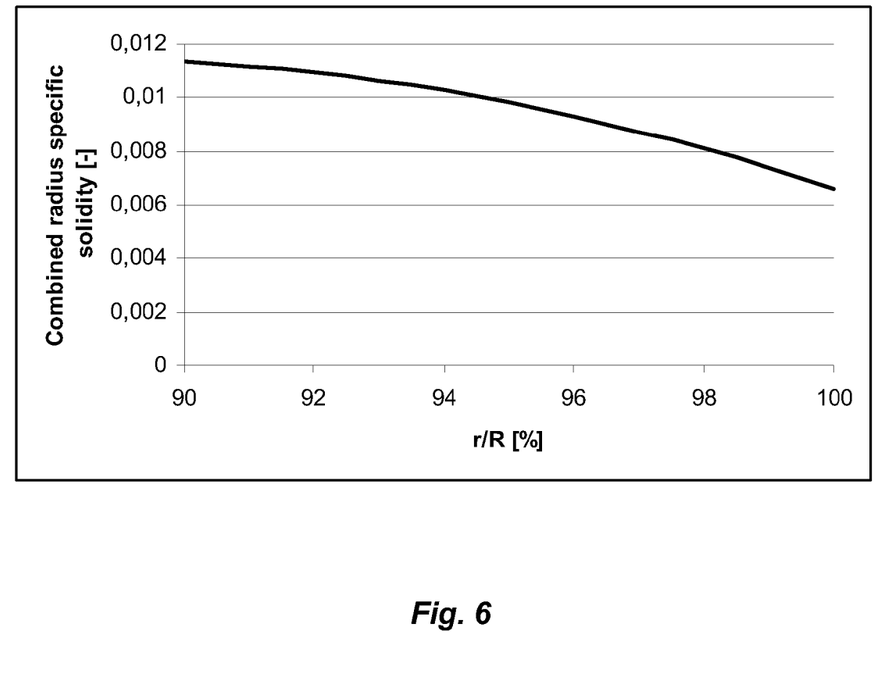
FIG. 6 shows a preferred combined radius specific solidity of the outer 10% of a wing turbine rotor having a 4% winglet height.

The combined radius specific solidity of the outer 10% of wind turbine blades has been calculated for three different examples of blade designs according to the present invention and are shown in FIGS. 4-6.

In FIG. 4, a design with a winglet height of 1% of the rotor radius is shown. The combined radius specific solidity ($Sol_r$) of the rotor at the tip end of the blades immediately adjacent the winglet is chosen to be 0.00435 which results in a constant C=−0.00355 for the above formula. For a 3-bladed wind turbine with a rotor diameter of 90 meter this equals a winglet height of 45 cm, a tip chord length of about 41 cm and a chord length at radius r=90% of the rotor radius of 45 meter of about 92 cm.

In FIG. 5, a design with a winglet height of 2% of the rotor radius is shown. The combined radius specific solidity ($Sol_r$) of the rotor at the tip end of the blades immediately adjacent the winglet is chosen to be 0.0057 which results in a constant C=−0.003085 for the above formula. For a 3-bladed wind turbine with a rotor diameter of 90 meter this equals a winglet height of 90 cm, a tip chord length of about 54 cm and a chord length at radius r=90% of the rotor radius of 45 meter of about 98 cm.

In FIG. 6, a design with a winglet height of 4% of the rotor radius is shown. The combined radius specific solidity ($Sol_r$) of the rotor at the tip end of the blades immediately adjacent the winglet is chosen to be 0.0057 which results in a constant C=−0.003212 for the above formula. For a 3-bladed wind turbine with a rotor diameter of 90 meter this equals a winglet height of 180 cm, a tip chord length of about 62 cm and a chord length at radius r=90% of the rotor radius of 45 meter of about 107 cm.

What is claimed is:

1. A wind turbine comprising a rotor with wind turbine blades each having a root end connected to a hub of the wind turbine and a tip end, the tip end of each of which being equipped with a winglet extending a distance in a direction perpendicularly to a longitudinal direction of the blade, wherein a combined radius specific solidity of the rotor at the tip end of the blades immediately adjacent the winglet is 0.085 times an extension of the winglet divided by a radius of the rotor plus a value within the range of 0.0012 and 0.0048, plus, the combined radius specific solidity of the rotor being defined as $$Sol_r = \frac{n \cdot c_r}{2\pi R}$$

n being a number of blades in the rotor, $C_r$ a chord length at a distance r from the hub and R the radius of the rotor.

2. The wind turbine according to claim 1, wherein said combined radius specific solidity of the rotor at the tip end of the blade is within the range of 0.0016 and 0.0042, plus 0.085 times the extension of the winglet divided by the radius of the rotor.

3. The wind turbine according to claim 1, wherein the combined radius specific solidity of the rotor increases continuously from the tip end of the blade and to a value in the range of 0.0065 to 0.013 at a position 5% of the rotor radius from the tip in the direction of the hub.

4. The wind turbine according to claim 3, wherein the combined radius specific solidity of the rotor increases substantially linearly from the tip end of the blade and to a position 5% of the rotor radius from the tip in the direction of the hub.

5. A wind turbine comprising a rotor with wind turbine blades each having a root end connected to a hub of the wind turbine and a tip end, the tip end of each of which being equipped with a winglet extending a distance in a direction perpendicularly to a longitudinal direction of the blade, wherein a combined radius specific solidity of the rotor at the tip end part of the blades substantially is designed in accordance with the formula $$Sol_r = -0.34087 \cdot \left(\frac{r}{R}\right)^2 + 0.6004 \cdot \left(\frac{r}{R}\right) - 1.236 \cdot \left(\frac{X_{height}}{R}\right)^2 + 0.12548 \cdot \left(\frac{X_{height}}{R}\right) - 0.25276 + C$$

r being a distance to the hub and R a radius of the rotor, wherein C is defined as a constant for the whole rotor design and is chosen within the range of −0.006 and 0.006, the combined radius specific solidity of the rotor being defined as $$Sol_r = \frac{n \cdot c_r}{2\pi R}$$

n being a number of blades in the rotor, $c_r$ a chord length at a distance r from the hub.

6. The wind turbine according to claim 5, wherein C is chosen within the range of −0.004 and 0.004.

7. The wind turbine according to claim 5, wherein said tip part being designed according to said formula constitutes at least an outer 5% of the blade length of each of the blades of the rotor.

8. The wind turbine according to claim 7, wherein said tip part being designed according to said formula constitutes at least an outer 8% of the blade length of each of the blades of the rotor.

9. The wind turbine according to claim 5, wherein the combined radius specific solidity of said tip part deviates less than 12% from the combined radius specific solidity defined by said formula.

10. The wind turbine according to claim 5, wherein the extension of the winglet constitutes in the range of 0.5% to 5% of the radius of the rotor.

11. The wind turbine according to claim 5, wherein a maximum lift coefficient $C_{l,max}$ of the blades where $C_{l,max}$ is valid for a two-dimensional flow passing a smooth profile surface, at the outer 10% of the radius R of the rotor is within the range of 0.9 and 2.0.

12. The wind turbine according to claim 5, wherein a maximum lift coefficient $C_{l,R}$ at the tip end of blades is within the range of 0.2 and 1.4.

13. The wind turbine according to claim 5, wherein the combined radius specific solidity of the winglet tip chord is within the range of 0.0 and 0.02 for blade radius r taken as the rotor radius R, and the maximum lift coefficient for the winglet tip chord is within the range of 0.0 and 0.4.

14. The wind turbine according to claim 13, wherein the combined radius specific solidity of the rotor at the tip end of the blades immediately adjacent the winglet is substantially equal to the combined radius specific solidity at the winglet root chord, and the combined radius specific solidity decreases substantially continuously from the winglet root chord to the winglet tip chord.

15. The wind turbine according to claim 14, wherein the combined radius specific solidity decreases substantially linearly between the winglet root chord and the winglet tip chord.

16. The wind turbine according to claim 5, wherein the winglets extend said distance to a suction side of the blades of the rotor.

17. The wind turbine according to claim 5, wherein a winglet inflow angle of attack $\alpha_{AoA}$ is in the range of −5 to 10°.

18. The wind turbine according to claim 5, wherein a winglet inclination angle of attack to blade is within the range of 70 to 150°.

19. The wind turbine according to claim 5, wherein a winglet leading edge displacement $X_{LED}$ is less than the winglet root chord.

20. The wind turbine according to claim 5, wherein a winglet trailing edge displacement $X_{TED}$ is less than plus or minus 30% of the winglet root chord.

21. The wind turbine blade having a root end with means for coupling said root end to a hub of a wind turbine and a tip end having a winglet, the blade being suitable for use in a wind turbine according to claim 5, wherein the number of wind turbine blades is n=2 or n=3.

* * * * *